(12) United States Patent
Akao et al.

(10) Patent No.: US 10,000,072 B2
(45) Date of Patent: Jun. 19, 2018

(54) PRINTER AND PRINTING JIG

(71) Applicant: Roland DG Corporation, Hamamatsu-shi, Shizuoka (JP)

(72) Inventors: Yoshihiko Akao, Hamamatsu (JP); Kenji Matsushime, Hamamatsu (JP); Takeomi Ohta, Hamamatsu (JP); Akira Fujita, Hamamatsu (JP); Tetsuhiro Kunifuji, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days. days.

(21) Appl. No.: 15/465,637

(22) Filed: Mar. 22, 2017

(65) Prior Publication Data
US 2017/0282594 A1  Oct. 5, 2017

(30) Foreign Application Priority Data

Mar. 30, 2016 (JP) ................. 2016-069188

(51) Int. Cl.
| | | |
|---|---|---|
| *B41J 3/407* | (2006.01) | |
| *H04N 1/00* | (2006.01) | |
| *B41J 2/01* | (2006.01) | |
| *B41J 11/00* | (2006.01) | |

(52) U.S. Cl.
CPC .............. *B41J 3/4073* (2013.01); *B41J 2/01* (2013.01); *B41J 11/008* (2013.01); *H04N 1/00809* (2013.01); *H04N 1/00827* (2013.01)

(58) Field of Classification Search
CPC ...... G06F 3/03545; G06F 19/20; G06F 19/26; G06F 19/321; G06F 19/3437; G06F 2203/0381; G06F 2203/04106; G06F 2203/04108; G06F 3/0346; G06F 3/038; G06F 3/0414; G06F 3/044; G06F 3/045; G06F 3/048
USPC ............ 355/67, 53, 77, 72, 52, 55; 382/112, 382/128, 151; 399/39, 74
See application file for complete search history.

(56) References Cited

U.S. PATENT DOCUMENTS

| | | | | |
|---|---|---|---|---|
| 5,906,158 | A * | 5/1999 | Takai .................. | B41F 15/0818 101/123 |
| 2003/0131468 | A1* | 7/2003 | Yasuda .................. | H05K 13/08 29/739 |
| 2004/0008243 | A1* | 1/2004 | Sekiya ................. | B41J 2/14016 347/95 |
| 2005/0018159 | A1* | 1/2005 | Van Buel .............. | G03F 9/7003 355/52 |
| 2007/0229893 | A1* | 10/2007 | Silverbrook ........ | G06F 3/03545 358/1.15 |

(Continued)

FOREIGN PATENT DOCUMENTS

JP       2007-136764 A       6/2007

*Primary Examiner* — Negussie Worku
(74) *Attorney, Agent, or Firm* — Keating & Bennett, LLP

(57) ABSTRACT

A printer includes a table, a print head, a detector, and a controller. The controller includes a storage to store initial print data including information of reference position marks, a reader to acquire, using the detector, positional information of position detection marks, a print data generator to modify the initial print data such that the reference position marks each coincide with an associated one of the position detection marks acquired by the reader, thus generating actual print data; and a printing controller to perform printing in accordance with the actual print data.

13 Claims, 6 Drawing Sheets

(56) References Cited

U.S. PATENT DOCUMENTS

| | | | |
|---|---|---|---|
| 2008/0211849 A1* | 9/2008 | Pierik | B41J 2/04508 347/14 |
| 2008/0273184 A1* | 11/2008 | Morimoto | G03B 27/68 355/52 |
| 2014/0291879 A1* | 10/2014 | Kruijt-Stegeman | B29C 59/022 264/40.1 |

* cited by examiner

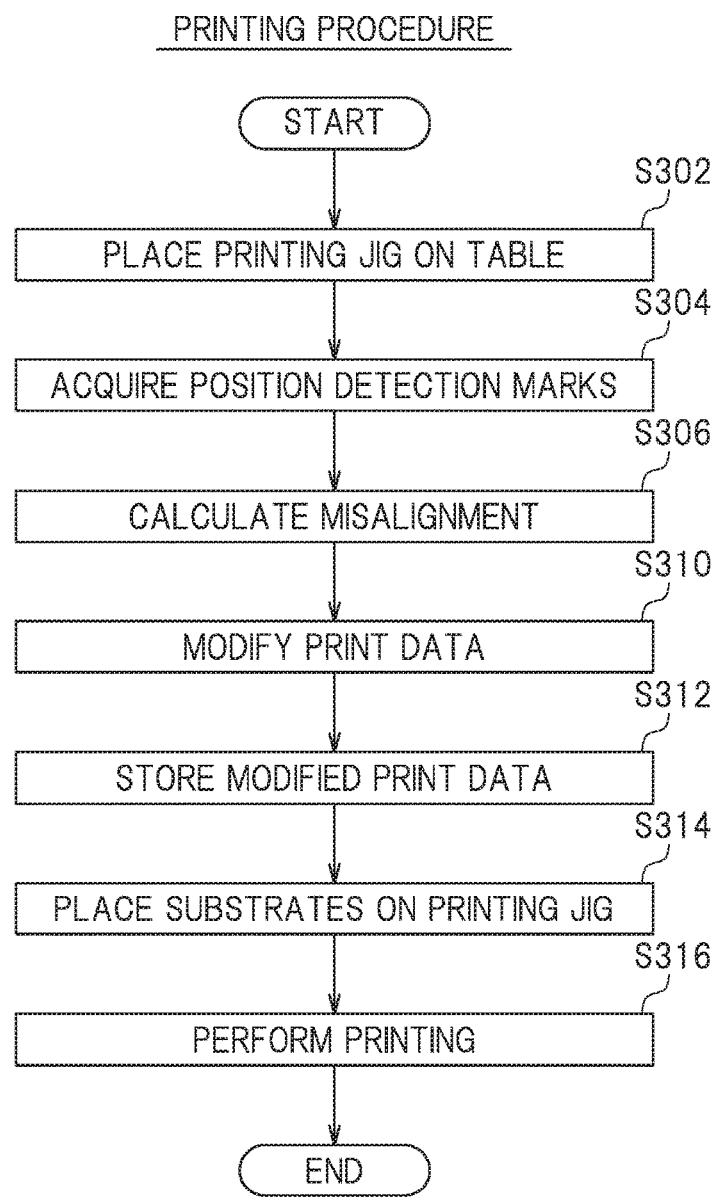

PRINTER AND PRINTING JIG

CROSS REFERENCE TO RELATED APPLICATIONS

This application claims the benefit of priority to Japanese Patent Application No. 2016-69188 filed on Mar. 30, 2016. The entire contents of this application are hereby incorporated herein by reference.

BACKGROUND OF THE INVENTION

1. Field of the Invention

The present invention relates generally to printers and printing jigs. More particularly, the present invention relates to a printer capable of direct printing on a three-dimensional substrate and to a printing jig suitable for the printer.

2. Description of the Related Art

A printer capable of direct printing on the surface of a three-dimensional substrate is known in the related art. Examples of such a printer include a "flatbed printer". Such a printer is widely used for printing on stationery products, such as ballpoint pens, and small articles, such as smartphone cases. A printer of this type includes a table on which a substrate is to be placed, and a print head to perform printing on the substrate. This printer moves the print head in performing printing on the substrate placed on the table.

When a flatbed printer performs printing, a substrate has to be placed accurately at a predetermined position on a table such that a printing position will not become misaligned. Such accurate placement of the substrate makes it necessary to measure dimensions of the substrate in advance so as to determine a substrate placement position with accuracy. This operation, however, requires extremely high accuracy, resulting in complicated operating steps and an increased burden on an operator. An unskilled operator takes time to perform such an operation, which may lead to a reduction in printing throughput.

JP 2007-136764 A, for example, discloses a technique to solve these problems. Specifically, JP 2007-136764 A discloses a printing jig including a placement jig capable of holding a substrate, and an installation jig which is to be detachably secured onto a table and on which the placement jig is to be installed in a replaceable manner. This technique involves, prior to printing, holding the substrate with the placement jig, and securing the installation jig on the table, with the placement jig installed on the installation jig. A position at which the substrate is to be held is decided in advance for the placement jig. This position is input in advance to a controller to control a printer. Such a configuration allows positioning of the substrate using the printing jig so as to perform printing in a predetermined position on the substrate.

The technique disclosed in JP 2007-136764 A involves combining the installation jig with the placement jig whose size is appropriate to a printable region, thus determining a printing position. Fabricating the installation jig suitable for use in combination with the placement jig, however, requires skills. If a dimensional error between the placement jig and the installation jig occurs during processing or the installation jig is secured on the table, with the installation jig itself being inclined, the printing position may become misaligned. In such a case, an operator must remake or relocate the installation jig and/or manually correct print data, which requires rework in the course of operation. Suppose that low-volume, high-variety printing is to be performed. In this case, each time the placement jig is replaced, the installation jig needs to be replaced with another suitable installation jig so as to accurately secure this installation jig onto the table. The time and effort required for this work increase the burden on the operator.

SUMMARY OF THE INVENTION

Accordingly, preferred embodiments of the invention provide a printer capable of stable printing in a desired position on a substrate while reducing the burden on an operator.

The inventors came up with the idea of generating, from initial print data, actual print data in accordance with the actual position of a jig placed on a table and performing printing on the basis of the actual print data.

A printer according to a preferred embodiment of the present invention performs printing on a substrate held by a printing jig including a plurality of position detection marks. The printer includes a table, a print head, a detector, and a controller. The table is provided to receive and support a printing jig in which the substrate is to be held. The print head is movable relative to the table. The print performs printing on the substrate held by the printing jig placed on the table. The detector detects the position detection marks of the printing jig placed on the table. The controller is connected to the print head and the detector. The controller includes a storage, a reader, a print data generator, and a printing controller. The storage stores initial print data including, for example, information of a plurality of reference position marks each associated with one of the position detection marks, and information of a design to be printed on the substrate. The reader acquires, using the detector, positional information of the position detection marks included in the printing jig, which is placed on the table. The print data generator modifies the initial print data such that the reference position marks stored in the storage each coincide with an associated one of the position detection marks acquired by the reader, thus generating actual print data to be used for actual printing. The printing controller controls the print head in accordance with the actual print data so as to perform printing on the substrate.

The printer modifies the initial print data on the basis of the actual positional information of the position detection marks, and performs actual printing in accordance with the actual print data resulting from the modification. In other words, the printer determines a design printing position in accordance with the position of the printing jig placed on the table. Thus, the printer performs stable printing with high positional accuracy. The printer saves an operator the trouble of having to place the printing jig at the exact position on the table, so that the operator does not have to perform an adjustment, such as positioning. The printer eliminates the need for the installation jig that is an essential component of the printing jig disclosed in JP 2007-136764 A. This saves time and effort involved in fabricating the installation jig and securing the installation jig onto the table.

A printer may perform a method involving, for example, detecting each of a plurality of points on the outline of a substrate, and correcting initial print data on the basis of positional information of each of the points detected. Performing such a method may require a highly sensitive detector and/or a high-performance controller for image processing, or may increase the time required for detection by a detector and/or the time required for arithmetic processing.

A printer according to a preferred embodiment of the present invention, however, is capable of deciding a printing position by a method simpler than the aforementioned method (or processes simpler than those involved in the aforementioned method). Thus, even if a general-purpose detector and/or a general-purpose controller are/is used, arithmetic processing would be carried out in a short time.

A printing jig according to a preferred embodiment of the present invention holds a substrate when a printer performs printing. The printing jig includes a holder to hold the substrate, and a plurality of position detection marks.

Various preferred embodiments of the present invention provide a printer and a printing jig that enable stable printing in a desired position on a substrate in a simple manner while reducing the burden for an operator.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a flow chart illustrating the procedure of printing according to the first preferred embodiment of the present invention.

DETAILED DESCRIPTION OF THE PREFERRED EMBODIMENTS

First Preferred Embodiment

A printer 10 and a printing method according to a first preferred embodiment of the present invention will be described below with reference to the drawings where appropriate. The reference signs F, Re, R, L, U, and D in FIG. 1 respectively represent front, rear, right, left, up and down. The terms "front", "rear", "right", "left", "up", and "down" used in the following description are defined for the sake of convenience and not intended to limit in any way how the printer 10 may be installed.

Figure 1:
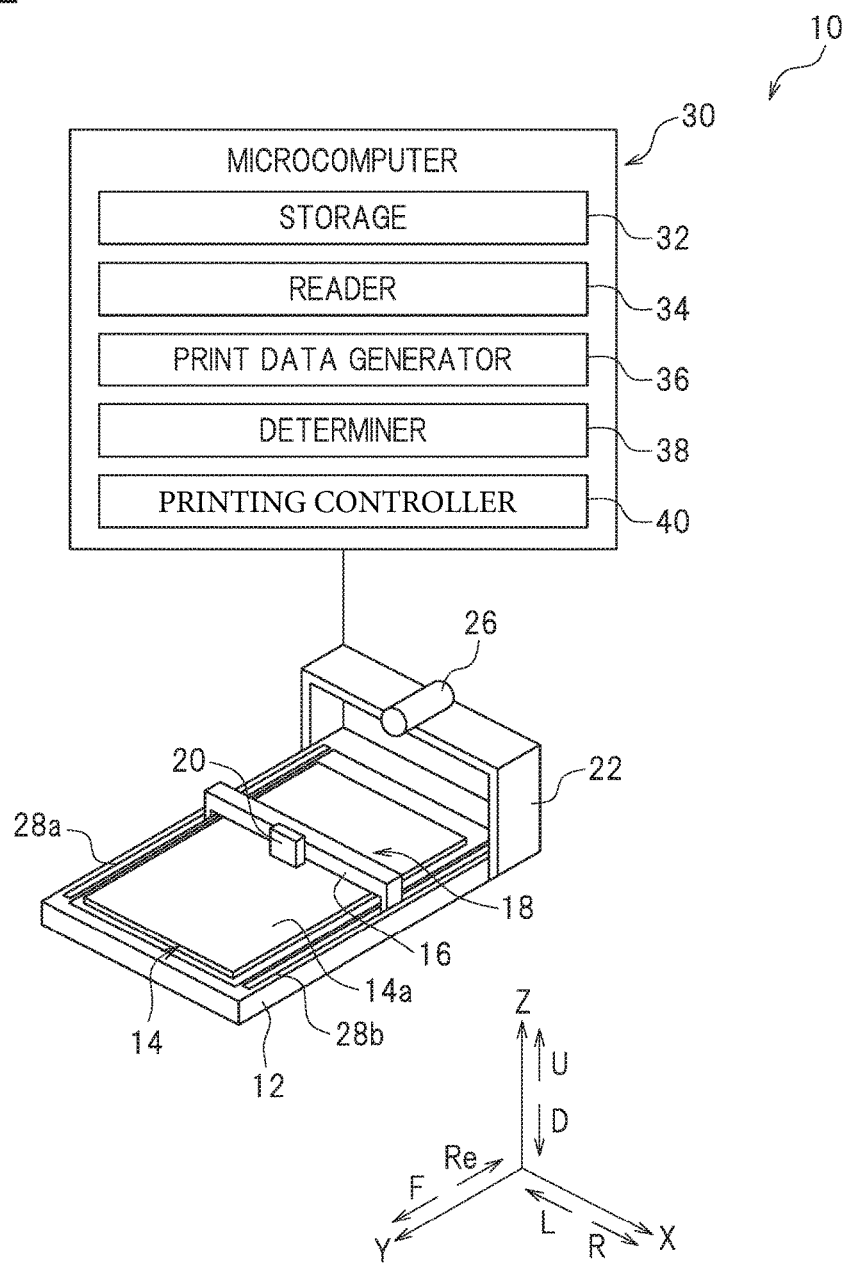
FIG. 1 is a diagram illustrating a schematic configuration of a printer according to a first preferred embodiment of the present invention.

First, the configuration of the printer 10 will be described. FIG. 1 illustrates the printer 10 according to the first preferred embodiment of the present invention. The printer 10 illustrated in FIG. 1 performs printing on substrates 200 (not illustrated in FIG. 1 but see FIGS. 6A and 6B) held by a printing jig 100 (not illustrated in FIG. 1 but see FIG. 2). The printer 10 preferably is a flatbed inkjet printer. The printer 10 preferably includes a base 12; a table 14 including an upper surface 14a; a movable member 18 including a rod-shaped element 16; a print head 20; a vertical member 22 extending vertically from the rear portion of the base 12; a sensor 26; and a microcomputer 30.

The table 14 is disposed on the base 12. The upper surface 14a of the table 14 is flat. The printing jig 100 to hold the substrates 200 is placed on the upper surface 14a. The print head 20 prints a desired design on each substrate 200. The table 14 is movable by a moving mechanism (not illustrated) within a predetermined range along the Z axis. Thus, the distance between the print head 20 and the substrates 200 is adjustable in accordance with the thickness of the substrates 200.

The base 12 is provided with guide grooves 28a and 28b extending along the Y axis. The movable member 18 is driven by a driving mechanism (not illustrated) and thus moves along the guide grooves 28a and 28b, i.e., along the Y axis. The driving mechanism is not limited to any particular mechanism. In one example, the driving mechanism may be a known mechanism, such as a combination of a gear and a motor. The rod-shaped element 16 extends along the X axis above the table 14. The Z axis is a vertical axis, the X axis is an axis perpendicular to the Z axis, and the Y axis is an axis perpendicular to the X axis and the Z axis.

The print head 20 is an ink head to discharge ink by an inkjet method. The print head 20 is movable relative to the table 14. The print head 20 performs printing on the substrates 200 placed on the table 14. The print head 20 is provided on the rod-shaped element 16. The print head 20 is movable along the X axis. Specifically, the print head 20 is in slidable engagement with a guide rail (not illustrated) on the front surface of the rod-shaped element 16. A belt (not illustrated) is provided for the print head 20. The belt is movable along the X axis. Winding up the belt by a driving mechanism (not illustrated) causes the belt to move. The movement of the belt moves the print head 20 from left to right or from right to left along the X axis. The driving mechanism is not limited to any particular mechanism. In one example, the driving mechanism may be a known mechanism, such as a combination of a gear and a motor.

Ink to be discharged from the print head 20 is not limited to any particular type of ink. In one example, ink to be discharged from the print head 20 is ultraviolet curable ink (UV curable ink) to be cured by ultraviolet light. UV curable ink is typically prepared by mixing a pigment, an ultraviolet curable monomer or oligomer, a photopolymerization initiator, and an optional additive, such as a polymerization inhibitor. As used herein, the term "inkjet method" refers to any printing method that utilizes any of various inkjet techniques known in the art. The term "inkjet method" may refer to any of various continuous methods, such as a binary deflection method and a continuous deflection method, or any of various on-demand methods, such as a thermal method and a piezoelectric element method.

The sensor 26 is secured to the vertical member 22. The sensor 26 is disposed such that the range of detection of the sensor 26 covers an entirety of the upper surface 14a of the table 14. The sensor 26 distinguishes position detection marks 102 (not illustrated in FIG. 1 but see FIG. 2) on the printing jig 100 from a portion of the printing jig 100 other than the position detection marks 102. In this preferred embodiment, the sensor 26 is an optical sensor to measure optical reflectance, for example.

The microcomputer 30 controls all operations of the printer 10. The hardware configuration of the microcomputer 30 is not limited to any particular configuration. In one example, the microcomputer 30 includes: a central processing unit (CPU) to execute a command for a control program; a read-only memory (ROM) storing the program to be executed by the CPU; a random-access memory (RAM) to be used as a working area where the program will be decompressed; and a storage (or a recording medium), such as a memory, to store the program and various data.

The microcomputer 30 is preferably configured or programmed to define and functions as: a storage 32 to store various information, such as initial print data set by an operator; a reader 34 to acquire, using the sensor 26, positional information of the position detection marks 102 of the printing jig 100 placed on the upper surface 14a of the table 14; a print data generator 36 to modify the initial print data on the basis of the acquired positional information of the position detection marks 102 so as to generate actual print data to be used for actual printing; a determiner 38 to determine whether the amount of substrate misalignment is within a predetermined allowable range; and a printing controller 40 to control the print head 20 in accordance with the actual print data so as to perform printing on the substrates 200. The microcomputer 30 may include circuits to implement functions similar to those just described. In this case, the storage 32, the reader 34, the print data generator 36, the determiner 38, and the printing controller 40 may be respectively replaced with a storage circuit 32, a reading circuit 34, a print data generating circuit 36, a determining circuit 38, and a printing circuit 40.

Figure 2:
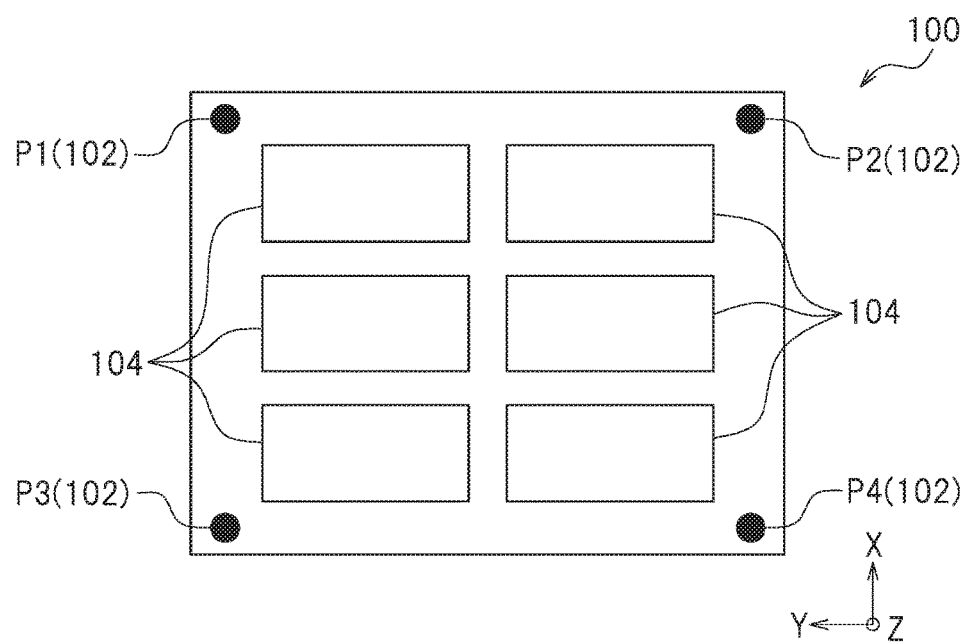
FIG. 2 is a schematic diagram illustrating an example of a printing jig.

The printing jig 100 will be described below. FIG. 2 is a schematic diagram illustrating an example of the printing jig 100. The printing jig 100 illustrated in FIG. 2 is used when printing is simultaneously performed on a plurality of the substrates 200. The printing jig 100 includes the position detection marks 102 and holders 104. The overall shape of the printing jig 100 is not limited to any particular shape as long as the printing jig 100 is stably placed on the upper surface 14a of the table 14. In this preferred embodiment, the printing jig 100 preferably is rectangular or substantially rectangular in overall shape. A material for the printing jig 100 is not limited to any particular material. In terms of mechanical strength (e.g., stiffness and durability) and/or prevention of movement of the printing jig 100 during printing, the printing jig 100 may be made of metal, such as stainless steel or aluminum, resin, clay, or wood, for example.

The position detection marks 102 provide positional information of the printing jig 100. The number of position detection marks 102 preferably is two or more for each printing jig 100, for example. In this preferred embodiment, the printing jig 100 preferably includes four position detection marks 102, for example. The upper left one of the position detection marks 102 may also be referred to as a "position detection mark P1". The upper right one of the position detection marks 102 may also be referred to as a "position detection mark P2". The lower left one of the position detection marks 102 may also be referred to as a "position detection mark P3". The lower right one of the position detection marks 102 may also be referred to as a "position detection mark P4". The position of each position detection mark 102 is not limited to any particular position. In terms of improvement in accuracy of the actual print data, the position detection marks 102 are preferably disposed in point symmetry with respect to the center of gravity of the printing jig 100, for example. In FIG. 2, the position detection marks P1 to P4 are provided equidistantly or substantially equidistantly on two diagonal lines passing through the center of gravity of the printing jig 100. The four position detection marks 102 are all located closer to the outer edge of the printing jig 100 than the holders 104. This means that the position detection marks 102 are each provided in an associated one of the four corners of the rectangular or substantially rectangular printing jig 100.

The position detection marks 102 are required to be distinguishable from a portion of the printing jig 100 other than the position detection marks 102 by the sensor 26. The position detection marks 102 are not limited to any particular shape and size. The position detection marks 102 may have the same shape and size or may have different shapes and sizes. The position detection marks 102 having different shapes and sizes enable quick and precise grasping of the positions of the position detection marks 102 on the printing jig 100 when, for example, the printing jig 100 that is rotated 180 degrees into an inverted position is placed on the table 14. The position detection marks 102 having different shapes and sizes also facilitate determination of the association between each position detection mark 102 and a reference position mark associated thereto. This may be effective in calculation of a misalignment amount (which will be described below).

In one example, the position detection marks 102 are grooves, holes, cut-outs, or dents that are physically provided by machining, such as cutting, and/or predetermined color(s) is/are applied to the position detection marks 102 by, for instance, coloring or printing. In terms of increasing positional accuracy, the position detection marks 102 are preferably provided by machining. At least one of the physical properties of the position detection marks 102, such as color and reflectance, is preferably different from that of a portion of the printing jig 100 other than the position detection marks 102 such that the position detection marks 102 are distinguishable from the substrates 200. In this preferred embodiment, each position detection mark 102 preferably is a cylindrical dent having a diameter of about 1 cm and colored in black, for example. This brings the optical reflectance of each position detection mark 102 close to zero. When the color of the printing jig 100 is brighter than black, the optical reflectance of each position detection mark 102 is lower than the optical reflectance of a portion of the printing jig 100 other than the position detection marks 102. In this case, the position detection marks 102 are clearly identifiable with the use of an optical sensor, for example.

The holders 104 hold the substrates 200. During printing, the substrates 200 are held by the holders 104. In one example, the holders 104 are provided by machining, such as cutting. This preferred embodiment involves simultaneously performing a process to provide the position detection marks 102 and a process to provide the holders 104. As used herein, the expression "simultaneously performing a process to provide the position detection marks 102 and a process to provide the holders 104" does not mean that these processes are performed at the same time but means that both of a process to provide the position detection marks 102 and a process to provide the holders 104 are performed during a time period between attachment of the printing jig 100 before being worked on to a jig of a cutting machine (not illustrated) and detachment of the printing jig 100 therefrom. Specifically, a plate-shaped member is first prepared, and then cutting is continuously performed on predetermined positions on the plate-shaped member in accordance with the same processing data so as to provide the position detection marks 102 and the holders 104. For example, suppose that a process to provide the position detection marks 102 and a process to provide the holders 104 are performed by different cutting machines. In such a case, these processes are performed separately, which may lead to accumulation of processing errors in each of the processes and errors in the positions of attachment to jigs. When the position detection marks 102 are provided by printing, the position detection marks 102 printed may not be located at desired positions with respect to the holders 104 provided. Simultaneously performing a process to provide the position detection marks 102 and a process to provide the holders 104 reduces errors in processing positions.

The number of holders 104 may be one, or may be two or more, for example. In this preferred embodiment, the holders 104 preferably are six in number and arranged at predetermined intervals in a grid pattern such that printing is simultaneously performed on the six substrates 200 at the maximum, for example. The six holders 104 are all located closer to the center of the printing jig 100 than the position detection marks 102. The size of each holder 104 is such that each holder 104 is capable of holding the associated substrate 200. In other words, the size of each holder 104 is larger than the size of the associated substrate 200. Each holder 104 typically has a shape similar or substantially similar to the outer shape of the associated substrate 200 in a plan view. In one example, each holder 104 has a rectangular or substantially rectangular shape. Each holder 104 is recessed from the surface of a portion of the printing jig 100 surrounding the holder 104. Each holder 104 is typically dented to a depth corresponding to the thickness of the associated substrate 200 in a cross-sectional view. Thus, the substrate 200 placed on the associated holder 104 is equal or substantially equal in height to the portion of the printing jig 100 surrounding the holder 104.

Each substrate 200 may naturally be a thin film or sheet, or a three-dimensional article, such as a stationery product (e.g., a ballpoint pen) or a smartphone case. A material for the substrates 200 may naturally be paper, such as plain paper, or any of various other materials. Examples of materials for the substrates 200 include: resin materials, such as polyethylene terephthalate (PET), ABS resin, polyvinyl chloride (PVC), polycarbonate (PC), and polystyrene (PS); metal materials, such as aluminum and iron; and wood.

Referring to FIG. 3, the procedure of printing on the substrates 200 by the printer 10 will be described below. Prior to printing, an operator first activates the printer 10 and makes settings for design(s) to be printed on the substrates 200, the size(s) of the design(s), the layout of the design(s), and information of the printing jig 100 so as to generate initial print job data. As used herein, the term "design" is a generic name for various designs, such as a character, a numeral, a sign, a picture, a pattern, and image data. Examples of the information of the printing jig 100 include: information of the number, positions and/or shapes of reference position marks associated with the position detection marks 102; and information of the number, positions and/or shapes of the holders 104. The relative positions of the position detection marks 102 and the holders 104 are determined in advance. The information of the printing jig 100 is preferably synchronized with processing data for the printing jig 100 used when a process to provide the position detection marks 102 and a process to provide the holders 104 are performed simultaneously. In one example, the information of the printing jig 100 is read in the form of, for instance, CAD data from an external computer. The initial print job data is stored in the storage 32 of the microcomputer 30.

The operator then places the printing jig 100 on the upper surface 14a of the table 14 (step 302). In this step, the operator does not necessarily have to place the printing jig 100 at the exact position within an X-Y plane but may place the printing jig 100 at any appropriate position within an X-Y plane as long as the printing jig 100 is located within a predetermined allowable range. In other words, the printing jig 100 placed within the X-Y plane on the upper surface 14a of the table 14, for example, may be deviated to some extent along the X axis and/or the Y axis or inclined to some extent relative to the X axis and the Y axis.

In this state, the operator provides an instruction to acquire positional information of the position detection marks 102. In response to this instruction, the microcomputer 30 exercises control such that the reader 34 causes the sensor 26 to operate. Thus, the sensor 26 acquires the positional information of the predetermined position detection marks 102 (step 304).

The positional information of each of the position detection marks 102 read by the reader 34 is compared with positional information of the associated reference position mark included in the initial print data. The position detection marks 102 are individually recognized on the basis of information included in the initial print job data (e.g., differences in shapes and sizes of the position detection marks 102, the positional relationships of the position detection marks 102 with the holders 104, and the positional relationships between the position detection marks 102). Each reference position mark associated with one of the position detection marks 102 is identified so as to calculate a misalignment amount indicative of how much the position detection mark 102 is misaligned relative to the associated reference position mark (step 306). As used herein, the term "misalignment amount" refers to a value indicative of how much an actual printing position is misaligned relative to a printing position indicated by the initial print data. In other words, the term "misalignment amount" refers to a value indicative of a relative difference between each reference position mark and the associated position detection mark 102. In one example, the misalignment amount is indicated by: an "X-Y misalignment amount (dx, dy)" indicative of the amount of upward, downward, rightward and/or leftward horizontal movement within the X-Y plane; and a "misalignment angle θ" indicative of the amount of rotational movement with respect to a predetermined rotational center.

Figure 4A:
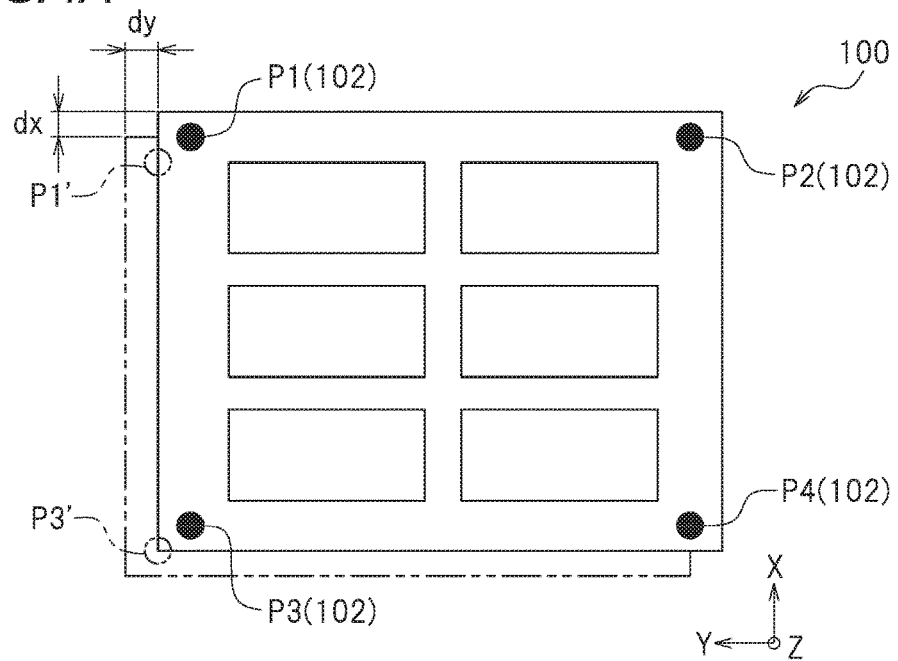
FIG. 4A is a schematic diagram illustrating the printing jig, which is placed on a table and misaligned by a predetermined X-Y misalignment amount (dx, dy) within an X-Y plane.
Figure 4B:
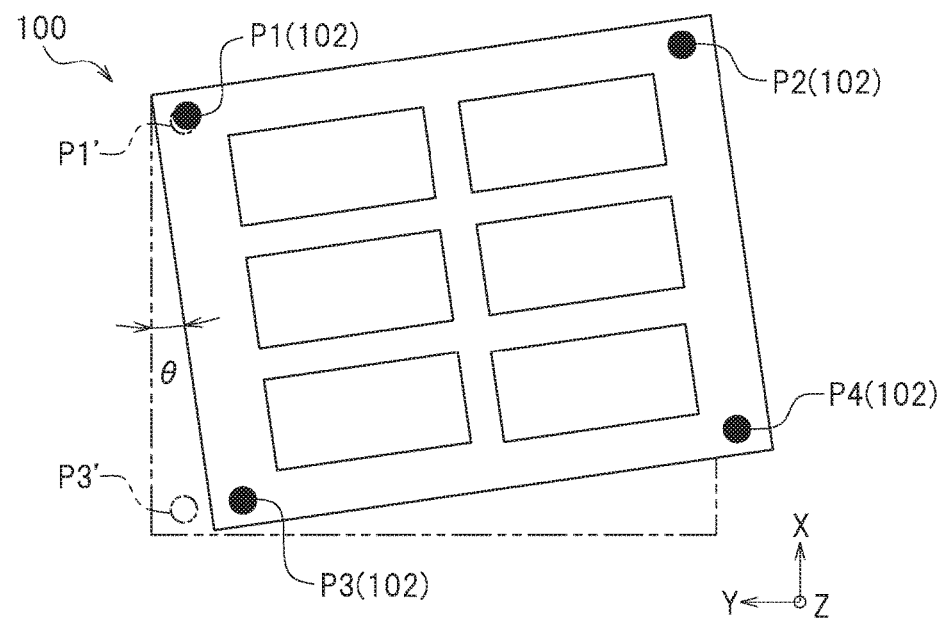
FIG. 4B is a schematic diagram illustrating the printing jig, which is placed on the table and misaligned by a predetermined misalignment angle $\theta$ within the X-Y plane.

Referring to FIG. 4, a specific example of a misalignment amount determining method will be described. FIGS. 4A and 4B are schematic diagrams each illustrating the printing jig 100 placed on the upper surface 14a of the table 14. The chain double-dashed lines in FIGS. 4A and 4B represent positional information of reference position marks included in initial print data, and positional information of the printing jig 100 determined on the basis of the positional information of the reference position marks. Note that in FIGS. 4A and 4B, reference position marks P1' and P3' are illustrated. The solid lines in FIGS. 4A and 4B represent positional information of the position detection marks 102 read by the sensor 26, and positional information of the printing jig 100 determined on the basis of the positional information of the position detection marks 102. FIG. 4A illustrates an example where the printing jig 100 is placed on the upper surface 14a of the table 14, such that the printing jig 100 is misaligned by a predetermined X-Y misalignment amount (dx, dy) along the X axis and the Y axis within the X-Y plane. The X-Y misalignment amount is represented as a vector quantity including directional and size information. Assuming that the position coordinates of the reference position mark P1' within the X-Y plane are represented by P1' (X1', Y1') and the coordinates of the position detection mark P1 read by the sensor 26 are represented by P1 (X1, Y1), the X-Y misalignment amount is calculated by the following equations:

$$dx = X1' - X1$$

$$dy = Y1' - Y1$$

The X-Y misalignment amount is increased in accuracy by calculating the values of misalignment of the position detection marks 102 and averaging the values calculated. Suppose that the printing jig 100 includes three or more position detection marks 102. In this case, positional information of all the position detection marks 102 may be read and used for calculation of the X-Y misalignment amount, or positional information of any predetermined one(s) of the position detection marks 102 may be selectively read and used for calculation of the X-Y misalignment amount. In one example, the position detection marks P1 and P2 may be selected and used for calculation of the X-Y misalignment amount. In another example, the position detection marks P1 and P3 may be selected and used for calculation of the X-Y misalignment amount. Usually, as the number of position detection marks 102 used increases, the time required for misalignment amount calculation increases, but the accuracy of misalignment amount calculation improves. Accordingly, the number of position detection marks 102 to be used for calculation of the X-Y misalignment amount is preferably decided in accordance with accuracy required, for example, in a manner that strikes a balance between the accuracy and time required for calculation of the X-Y misalignment amount.

FIG. 4B illustrates an example where the printing jig 100 is placed on the upper surface 14a of the table 14, such that the printing jig 100 is misaligned by the predetermined misalignment angle θ. The misalignment angle θ indicates a rotation angle with respect to a predetermined rotational center. Calculation of the misalignment angle θ involves first selecting, for example, any two of the position detection marks 102 and then horizontally moving one of the selected position detection marks 102 to a position indicated by the coordinates of the associated reference position mark. In this preferred embodiment, calculating the misalignment angle θ involves selecting the position detection marks P1 and P3 from the position detection marks P1 to P4 so as to read positional information of the position detection marks P1 and P3, and superposing the position detection mark P1 on the associated reference position mark P1'. Supposing that the reference position mark P3' is associated with the position detection mark P3, the misalignment angle θ is calculated using trigonometric functions obtained from the distance in a straight line between the position detection marks P1 and P3, the distance in a straight line between the position detection mark P1 and the reference position mark P3', and the distance in a straight line between the reference position mark P3' and the position detection mark P3.

On the basis of the misalignment amount calculated, the print data generator 36 of the microcomputer 30 modifies the initial print job data stored in the storage 32 (step 310). In one example, the coordinates of a printing start point in the initial print job data are moved along the X axis (i.e., upward and/or downward) and/or along the Y axis (i.e., rightward and/or leftward) so as to cancel the "X-Y misalignment amount (dx, dy)" calculated. In another example, the initial print job data is rotated with respect to the predetermined rotational center so as to cancel the "misalignment angle θ" calculated. The print job data stored in the storage 32 is overwritten with the print job data thus modified (step 312). The resulting print job data serves as actual print job data to be used for actual printing on the substrates 200.

The operator then places the substrates 200 on the holders 104 of the printing jig 100 such that the surfaces of the substrates 200 to be subjected to printing face upward (step 314). In this state, the operator provides an instruction to start printing. In response to this instruction, the printing controller 40 of the microcomputer 30 controls the print head 20 so as to perform printing on the substrates 200 on the basis of the actual print job data (step 316). Specifically, the print head 20 moves relative to the table 14 while discharging ink, so that a desired design is printed on each substrate 200.

Performing the above-described steps using the printer 10 according to this preferred embodiment enables designs to be stably printed on desired positions on the substrates 200 with simple operation. The operator does not have to fabricate any installation jig or perform accurate positioning each time printing is performed, so that the burden on the operator in this preferred embodiment is less than when a conventional printer is used. Thus, this preferred embodiment increases the convenience of the operator and enhances operating efficiency. If low-volume, high-variety printing is to be performed, this preferred embodiment would enable printing without any increase in cost.

In this preferred embodiment, the printing jig 100 preferably includes N position detection marks 102 (where N 3). In the preferred embodiment illustrated in FIG. 2, the printing jig 100 preferably has a rectangular or substantially rectangular shape and includes the position detection marks 102 in the four corners of the rectangular printing jig 100, for example. This reduces errors in printing position adjustment and further increases printing accuracy. In this preferred embodiment, the reader 34 selects one or more position detection marks 102 from the N position detection marks 102 so as to read the position detection mark(s) 102 selected (where the number of position detection marks 102 to be selected is N−1 or less). This configuration makes it possible to strike a high level balance between the accuracy of printing position adjustment and reduction in time required for detection of the position detection marks 102 and arithmetic processing for the position detection marks 102.

In this preferred embodiment, the optical reflectance of each position detection mark 102 differs from the optical reflectance of a portion of the printing jig 100 other than the position detection marks 102. The sensor 26 is an optical sensor to measure optical reflectance. Thus, the sensor 26 detects the position detection marks 102 without coming into contact with the substrates 200.

In this preferred embodiment, the printing jig 100 includes a plurality of the holders 104 each structured to hold an associated one of the substrates 200. This enables simultaneous printing on a plurality of the substrates 200, resulting in a significant increase in printing throughput.

In this preferred embodiment, each holder 104 of the printing jig 100 is recessed from the surface of a portion of the printing jig 100 surrounding the holder 104. Each holder 104 and the portion of the printing jig 100 surrounding the holder 104 are structured so that each substrate 200 placed on the associated holder 104 is equal or substantially equal in height to the portion of the printing jig 100 surrounding the holder 104. This configuration enables securing of the position of each substrate 200 that has a three-dimensional shape, so that the substrates 200 are stably held during printing. Consequently, printing position accuracy is further improved.

In this preferred embodiment, the printing jig 100 is preferably fabricated by a method including the steps of: preparing a plate-shaped member; and simultaneously performing a process to provide the holders 104 each structured to hold the associated substrate 200 and a process to provide the position detection marks 102 such that the holders 104 and the position detection marks 102 are each disposed at a predetermined position on the plate-shaped member. This fabricating method significantly reduces or minimizes errors during the processes.

Second Preferred Embodiment

Figure 6A:
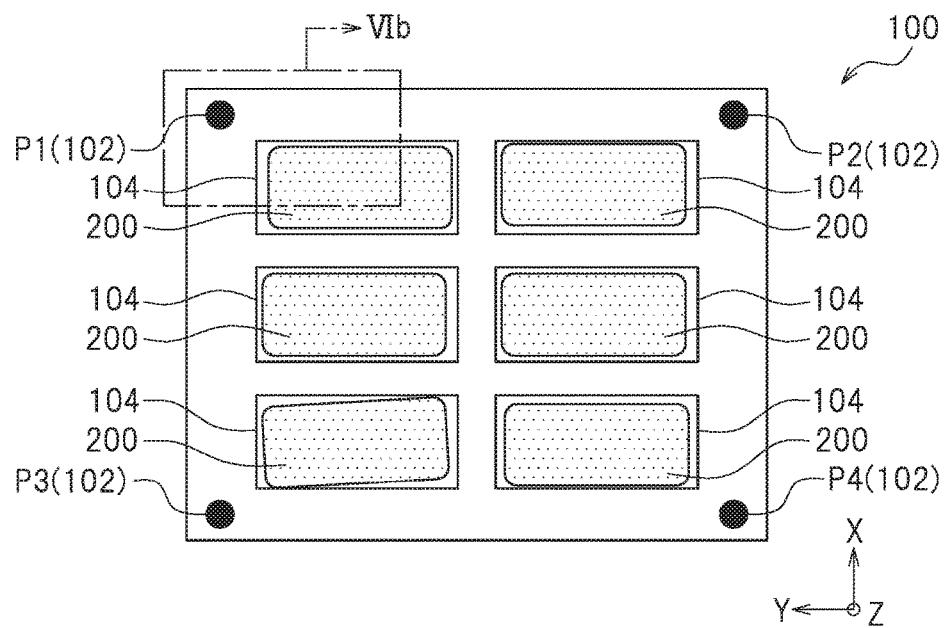
FIG. 6A is an overall view of the printing jig, schematically illustrating substrates held by the printing jig.
Figure 6B:
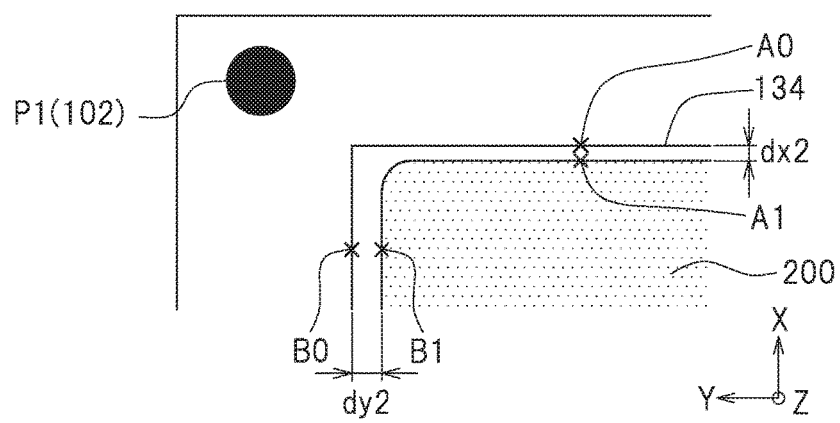
FIG. 6B is a partially enlarged view of the printing jig illustrated in FIG. 6A.

A second preferred embodiment of the present invention involves not only generating actual print data in consideration of the location of the printing jig 100 placed on the table 14, but also updating the actual print data in consideration of the locations of the substrates 200 placed in the holders 104 of the printing jig 100. Referring to FIGS. 6A and 6B, how the actual print data is updated will be described. FIG. 6A is a schematic diagram illustrating how the substrates 200 are held by the holders 104 of the printing jig 100. Each holder 104 of the printing jig 100 is structured to reliably hold the associated substrate 200, with a predetermined space (or play) provided between the holder 104 and the substrate 200. In terms of performing high accuracy printing in desired printing positions, the actual print data is preferably generated in consideration of this "play".

Figure 5:
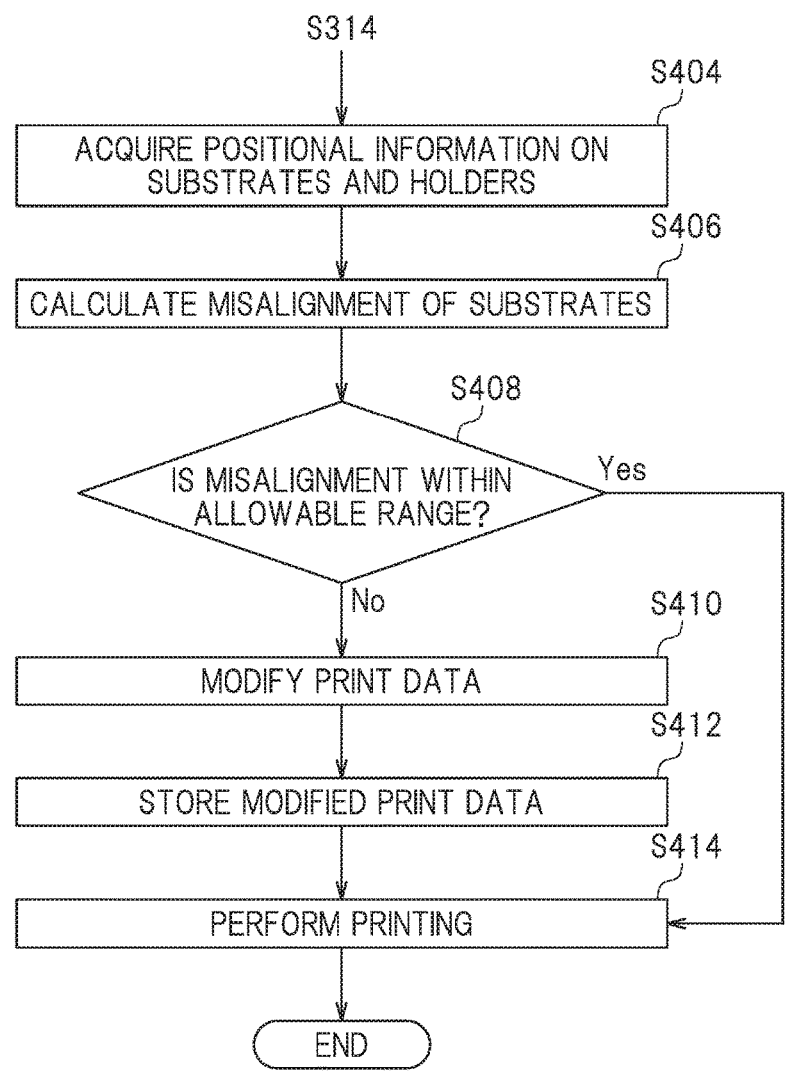
FIG. 5 is a flow chart illustrating the procedure of printing according to a second preferred embodiment of the present invention.

Referring to FIG. 5, the procedure of printing according to the second preferred embodiment will be described. Following step 314 in the first preferred embodiment (i.e., the placement of the substrates 200 on the holders 104), the second preferred embodiment involves detecting the positional relationship between each substrate 200 and the associated holder 104. Specifically, the operator provides an instruction to acquire positional information indicative of the positional relationship, and the reader 34 causes, in response to this instruction, the sensor 26 to operate under the control of the microcomputer 30. The sensor 26 acquires a pair of items of positional information of a first detection point on the edge of each holder 104 and a second detection point on the outline of the associated substrate 200 (step 404).

Spots for which positional information is to be acquired and the number of the spots are preferably decided in accordance with the shapes of the substrates 200 and the holders 104. In one example, assuming that the holders 104 and the substrates 200 each have a polygonal shape, the sensor 26 preferably acquires a pair of items of positional information of any one or more of vertices. In another example, assuming that the holders 104 and the substrates 200 each preferably have a rectangular or substantially rectangular shape with long and short sides, the sensor 26 preferably acquires, for one or more spots determined for the long sides and one or more spots determined for the short sides, a pair of items of positional information of a first detection point on the edge of each holder 104 and a second detection point on the outline of the associated substrate 200. In this example, the second detection point is obtained by drawing a perpendicular line from the first detection point. In still another example, the sensor 26 preferably acquires a pair of items of positional information of any detection point on the outline of each substrate 200 and a detection point located on the edge of the associated holder 104 and closest to the substrate 200. Because the coordinates indicative of the position of the position detection mark P1 are already detected (see the first preferred embodiment), the locations of the holders 104 are approximately determined on the basis of these coordinates in the second preferred embodiment. Accordingly, if the number of spots for which information is to be acquired increases to some degree, for example, the second preferred embodiment would enable quick detection and grasping of the spots for which positional information is to be acquired, and would allow the sensor 26 to perform scanning in a short time.

The print data generator 36 of the microcomputer 30 makes a comparison between the positional information of each substrate 200 and the positional information of the associated holder 104 read by the reader 34 so as to calculate the amount of misalignment of each substrate 200 relative to the associated holder 104 (step 406). Similarly to the case where a relative difference between each position detection mark 102 and the associated reference position mark is determined in the first preferred embodiment, the amount of misalignment of each substrate 200 relative to the associated holder 104 is indicated by, for example, an X-Y misalignment amount or a misalignment angle.

FIG. 6B is a partially enlarged view of the printing jig 100, illustrating a portion of the printing jig 100 in FIG. 6A adjacent to the position detection mark P1 (i.e., the upper left portion of the printing jig 100 in FIG. 6A). Referring to FIG. 6B, an X-Y misalignment amount is calculated from a difference between a point on the outline of the substrate 200 and a point on the edge of the holder 104. Specifically, for the long sides of the substrate 200 and the holder 104 perpendicular to the X axis, an X axis misalignment amount dx2 is calculated from a difference (A1−A0) between a point A1 on the outline of the substrate 200 and a point A0 on the edge of the holder 104. For the short sides of the substrate 200 and the holder 104 perpendicular to the Y axis, a Y axis misalignment amount dy2 is calculated from a difference (B1−B0) between a point B1 on the outline of the substrate 200 and a point B0 on the edge of the holder 104. Suppose that the substrate 200 is placed on the associated holder 104, with the substrate 200 inclined relative to the holder 104. In such a case, a misalignment angle is preferably calculated by a method similar to that described in the first preferred embodiment except that the misalignment angle is calculated on the basis of a plurality of pairs of items of positional information for two or more spots.

The determiner 38 of the microcomputer 30 determines whether the amount of misalignment of each substrate 200 calculated is within a predetermined allowable range (step 408). When the misalignment amount is within the predetermined allowable range (i.e., when the answer is Yes in step 408), the determiner 38 determines that further modification (or updating) of the actual print job data is unnecessary. When the misalignment amount exceeds the predetermined allowable range (i.e., when the answer is No in step 408), the determiner 38 determines that further modification of the actual print job data stored in the storage 32 is necessary.

Following the determination that updating is necessary, the print data generator 36 of the microcomputer 30 modifies the latest actual print job data stored in the storage 32. Specifically, the actual print job data stored in step 312 is further modified on the basis of the calculated amount of misalignment of each substrate 200 relative to the associated holder 104 (step 410). The print job data stored in the storage 32 is overwritten with the modified print job data (step 412). The resulting print job data serves as the actual print job data to be used for actual printing. In response to a printing start instruction from the operator, the printing controller 40 of the microcomputer 30 controls the print head 20 so as to perform printing on each substrate 200 on the basis of the actual print job data (step 414). When the determiner 38 determines in step 408 that updating is unnecessary, printing is performed on the basis of the actual print job data stored in the storage 32 in step 312.

When the misalignment of the printing jig 100 and the misalignment of each substrate 200 are detectable by the sensor 26, the second preferred embodiment involves adjusting the printing position in accordance with the location of the printing jig 100 placed on the table 14 and then adjusting print job data in accordance with the positional relationship between each holder 104 and the associated substrate 200. In one example, the holders 104 of the printing jig 100 each include an edge including a first detection point to be detected by the sensor 26 and hold the associated substrate 200 such that the substrate 200 is located inward of the edge. In this example, the reader 34 acquires positional information of the first and second detection points. The print data generator 36 calculates a distance between the first and second detection points read by the reader 34 and updates the actual print data on the basis of the distance. This makes it possible to correct the amount of X-Y misalignment between each holder 104 and the associated substrate 200.

In a particularly preferred embodiment, a plurality of pairs of the first and second detection points are set, and the reader 34 acquires positional information of the pairs of first and second detection points. This also makes it possible to correct the angle of misalignment between each holder 104 and the associated substrate 200. Consequently, printing position accuracy further increases, resulting in higher printing quality. Such a preferred embodiment is particularly effective when the size of each substrate 200 is considerably different from the size of the associated holder 104, for example.

The above preferred embodiments may include Variations 1 to 5 described below. The present invention may include any suitable combination of the above preferred embodiments and Variations 1 to 5 described below.

Variation 1

Although the printer 10 preferably is an inkjet printer in the above preferred embodiments, the printer 10 may be any other printer. Examples of the printer 10 include a dot-impact printer and a laser printer.

Variation 2

Although the above preferred embodiments have been described on the assumption that printing is performed on four or six substrates 200, the number of substrates 200 is not limited to four or six. The number of substrates 200 may be one, two, three, five, or seven or more, for example.

Variation 3

Although the above preferred embodiments have been described on the assumption that the single printing jig 100 includes four position detection marks 102, the number of position detection marks 102 included in the printing jig 100 is not limited to four. The printing jig 100 is required to include more than one position detection mark 102. The number of position detection marks 102 included in the printing jig 100 may be three or more, five or more, or ten or less, for example.

Variation 4

Although the position detection mark sensor 26 is an optical sensor to measure optical reflectance in the above preferred embodiments, the sensor 26 may be any other sensor. The sensor 26 may detect a step, a color, and/or a luster, for example. In one example, the sensor 26 may be a camera capable of capturing at least a gray scale image.

Variation 5

The second preferred embodiment described above preferably includes: placing only the printing jig 100 on the upper surface 14*a* of the table 14; acquiring positional information of the position detection marks 102; and updating print job data on the basis of the positional information acquired. The second preferred embodiment then includes: placing the substrates 200 on the printing jig 100; acquiring positional information of the substrates 200; and updating the print job data again on the basis of the positional information acquired. The present invention, however, is not limited to this method. When the position detection marks 102 and the substrates 200 are detectable by the sensor 26, for example, the printing jig 100 and the substrates 200 may be placed simultaneously on the table 14 so as to perform the above-mentioned two-stage modifying operations at a time.

The terms and expressions used herein are used for explanation purposes and should not be construed as being restrictive. It should be appreciated that the terms and expressions used herein do not eliminate any equivalents of features illustrated and mentioned herein, and allow various modifications falling within the claimed scope of the present invention. The present invention may be embodied in many different forms. The present disclosure is to be considered as providing examples of the principles, preferred embodiments and modifications thereof, of the present invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printer that prints on a substrate held by a printing jig including a plurality of position detection marks, the printer comprising:

a table on which the printing jig to hold the substrate is to be placed in an X-Y plane;

a print head movable relative to the table and performing printing on the substrate held by the printing jig placed on the table;

a detector that detects positional information in the X-Y plane of the position detection marks of the printing jig placed on the table; and a controller connected to the print head and the detector, wherein the controller is configured or programmed to include:

a storage to store initial print data including information of a plurality of reference position marks each associated with one of the positional information of the position detection marks, and information of a design to be printed on the substrate;

a reader to acquire, using the detector, the positional information in the X-Y plane of the position detection marks of the printing jig, which is placed on the table;

a print data generator to modify the initial print data according to the acquired positional information of the position detection marks such that the reference position marks stored in the storage each coincide with an associated one of the positional information of the position detection marks acquired by the reader, thus generating actual print data to be used for actual printing; and a printing controller to control the print head in accordance with the actual print data so as to perform printing on the substrate.

2. The printer according to claim 1, wherein a number of position detection marks included in the printing jig is N, where N≥3; and the reader selects one or more position detection marks from the N position detection marks and reads the position detection mark or position detection marks selected, where the number of position detection marks to be selected is N−1 or less.

3. The printer according to claim 2, wherein the printing jig has a rectangular or substantially rectangular shape; and the position detection marks are each disposed in an associated one of four corners of the rectangular or substantially rectangular printing jig.

4. The printer according to claim 1, wherein the printing jig includes a holder including an edge including a first detection point to be detected by the detector, the holder being structured to hold the substrate such that the substrate is located inward of the edge;

the substrate includes a second detection point to be detected by the detector, the second detection point being disposed in association with the first detection point when the substrate is held at a predetermined position inside the holder of the printing jig;

the reader acquires positional information of the first and second detection points; and the print data generator calculates a distance between the first and second detection points read by the reader and update the actual print data in accordance with the distance.

5. The printer according to claim 4, wherein the first and second detection points are provided in pairs; and the reader acquires positional information of the pairs of first and second detection points.

6. The printer according to claim 1, wherein the position detection marks are different in optical reflectance from a portion of the printing jig other than the position detection marks; and the detector is an optical sensor to measure optical reflectance.

7. The printer according to claim 1, wherein the print data generator is configured or programmed:

to calculate a misalignment amount indicative of how much the position detection mark is misaligned relative to the associated reference position mark within the X-Y plane; and to move the print start point of the initial print data in the X-Y plane so as to cancel the misalignment amount.

8. The printer according to claim 7, wherein the print data generator is configured or programmed:

to calculate a X-Y misalignment amount (dx, dy) indicative of the amount of X direction and/or Y direction horizontal movement within the X-Y plane; and to move the print start point of the initial print data in the X-Y plane so as to cancel the X-Y misalignment amount.

9. The printer according to claim 7, wherein the print data generator is configured or programmed:

to calculate a misalignment angle Θ indicative of the amount of rotational movement with respect to a predetermined rotational center within the X-Y plane; and to move the print start point of the initial print data in the X-Y plane so as to cancel the misalignment angle Θ.

10. A printing jig to hold a substrate when a printer performs printing, the printing jig comprising:

a surface;

a holder located on the surface, the holder holding the substrate; and a plurality of position detection marks that are each formed on the surface and located outside of a portion of the surface covered by the holder, wherein the holder is a recess that accommodates the substrate.

11. The printing jig according to claim 10, wherein the holder includes a plurality of holders.

12. The printing jig according to claim 10, wherein the holder and the portion of the surface surrounding the holder are structured so that the substrate placed on the holder is equal or substantially equal in height to the portion of the surface surrounding the holder.

13. A method for fabricating the printing jig according to claim 10, the method comprising:

preparing a plate-shaped member; and simultaneously performing a process to provide the holder to hold the substrate and a process to provide the position detection marks such that the holder and the position detection marks are each disposed at a predetermined position on the plate-shaped member.

* * * * *